(12) United States Patent
Pol et al.

(10) Patent No.: US 11,572,444 B2
(45) Date of Patent: Feb. 7, 2023

(54) METHOD FOR THE MODIFICATION OF WOOD

(71) Applicant: TITAN WOOD LIMITED, Windsor (GB)

(72) Inventors: Bernardus Jozef Maria Pol, Windsor (GB); Stefan Van Dommele, Windsor (GB); Paul Bussemaker, Windsor (GB); Benjamin Painter, Windsor (GB); Gerrit Arie De Wit, Windsor (GB); Theodorus Gerardus Marinus Maria Kappen, Windsor (GB)

(73) Assignee: TITAN WOOD LIMITED, London (GB)

( * ) Notice: Subject to any disclaimer, the term of this patent is extended or adjusted under 35 U.S.C. 154(b) by 738 days.

(21) Appl. No.: 14/387,170

(22) PCT Filed: Mar. 21, 2013

(86) PCT No.: PCT/EP2013/055983
§ 371 (c)(1),
(2) Date: Sep. 22, 2014

(87) PCT Pub. No.: WO2013/139937
PCT Pub. Date: Sep. 26, 2013

(65) Prior Publication Data
US 2015/0051386 A1    Feb. 19, 2015

(30) Foreign Application Priority Data

Mar. 21, 2012    (EP) .................................... 12160598

(51) Int. Cl.
*C08H 8/00*    (2010.01)
*C08L 97/02*    (2006.01)
(Continued)

(52) U.S. Cl.
CPC .................. *C08H 8/00* (2013.01); *B01J 8/10* (2013.01); *B05D 3/0209* (2013.01); *B05D 3/04* (2013.01);
(Continued)

(58) Field of Classification Search
CPC ........................................................ B27K 3/36
See application file for complete search history.

(56) References Cited

U.S. PATENT DOCUMENTS 1,648,295 A * 11/1927 Coolidge ............. B27K 3/0278
428/485
2,031,973 A * 2/1936 Mudge ..................... B27K 3/52
427/325
(Continued)

FOREIGN PATENT DOCUMENTS

EP    0213252 B1    2/1991
EP    0650998 A1    5/1995
(Continued)

OTHER PUBLICATIONS

Papadopoulus et al. (Holz als Roh—und Werkstoff (2006) 64: 21-23) (Year: 2006).*
(Continued)

*Primary Examiner* — Liam J Heincer
(74) *Attorney, Agent, or Firm* — Innovation Capital Law Group, LLP; Vic Lin

(57) ABSTRACT

The invention is directed to a process for the continuous acetylation of wood elements. The process particularly combines a batchwise impregnation step, with a continuous reaction step. In order to realize this, a collection step is built-in, so as to allow batches of impregnated wood elements to be fed into a reactor in a continuous manner. Very (Continued)

high acetylation contents can be obtained, at a level that had not been achievable before in a continuous and non-catalyzed acetylation process.

17 Claims, 1 Drawing Sheet

(51) Int. Cl.
*B01J 8/10* (2006.01)
*B05D 3/02* (2006.01)
*B05D 3/04* (2006.01)
*B05D 7/10* (2006.01)
*B27K 3/08* (2006.01)
*B27K 3/10* (2006.01)
*B27K 3/34* (2006.01)

(52) U.S. Cl.
CPC ................. *B05D 7/10* (2013.01); *B27K 3/08* (2013.01); *B27K 3/10* (2013.01); *C08L 97/02* (2013.01); *B27K 3/346* (2013.01)

(56) References Cited

U.S. PATENT DOCUMENTS

| | | | | |
|---|---|---|---|---|
| 2,417,995 A * | 3/1947 | Stamm | ................ | B27K 3/0271 427/254 |
| 3,094,431 A * | 6/1963 | Goldstein | ................ | C08H 8/00 34/404 |
| 4,592,962 A * | 6/1986 | Aoki | ................ | B27K 3/0214 427/325 |
| 5,525,721 A * | 6/1996 | Ohshima | ................ | C08B 3/06 536/69 |
| 5,608,051 A | 3/1997 | Nelson et al. | | |
| 5,777,101 A * | 7/1998 | Nelson | ................ | B27N 1/00 536/115 |
| 5,821,359 A * | 10/1998 | Nelson | ................ | C08B 3/06 536/56 |
| 6,632,326 B1 | 10/2003 | Hirano et al. | | |
| 9,453,302 B2 * | 9/2016 | Painter | ................ | C08H 8/00 |
| 2004/0258941 A1 * | 12/2004 | Neogi | ................ | C08B 3/00 428/537.1 |
| 2006/0083910 A1 * | 4/2006 | Hoglinger | ................ | C08B 3/06 428/292.4 |
| 2007/0128422 A1 * | 6/2007 | Nasheri | ................ | B27K 3/0271 428/292.4 |
| 2009/0247788 A1 * | 10/2009 | Warner | ................ | C07C 51/46 562/608 |
| 2010/0024806 A1 * | 2/2010 | Burke | ................ | C12M 33/16 127/1 |
| 2010/0234557 A1 | 9/2010 | Sato et al. | | |
| 2011/0091736 A1 * | 4/2011 | Felty, Jr. | ................ | C08L 1/12 428/541 |
| 2012/0079762 A1 * | 4/2012 | Schottdorf | ................ | C10B 39/02 44/606 |
| 2015/0050483 A1 * | 2/2015 | Pol | ................ | B27K 3/08 428/220 |
| 2015/0165642 A1 * | 6/2015 | Rademakers | ................ | C08H 8/00 427/297 |
| 2017/0096499 A1 * | 4/2017 | Van Dommele | ................ | C08B 3/06 |
| 2017/0173819 A1 * | 6/2017 | Turnbull | ................ | B27K 3/10 |
| 2017/0203467 A1 * | 7/2017 | Pol | ................ | B27K 3/0278 |
| 2017/0204043 A1 * | 7/2017 | Benstead | ................ | B27K 3/0292 |

FOREIGN PATENT DOCUMENTS

JP 2007216438 8/2007
WO 2012037481 A1 3/2012

OTHER PUBLICATIONS

Pommer et al. (Wood, Preservation, Ulmann's Encyclopedia of Industrial Chemistry, vol. 39, 2012, p. 507-536) (Year: 2012).*
de Prada et al. (Ind. Eng. Chem. Res. 2011, 50, 5041-5049) (Year: 2011).*
Nilsson et al. (Holzforschung 42, 1988, 123-126). (Year: 1988).*
International Search Report (dated Sep. 16, 2013) for International Application No. PCT/EP2013/055983 filed on Mar. 21, 2013, 5 pages.

* cited by examiner

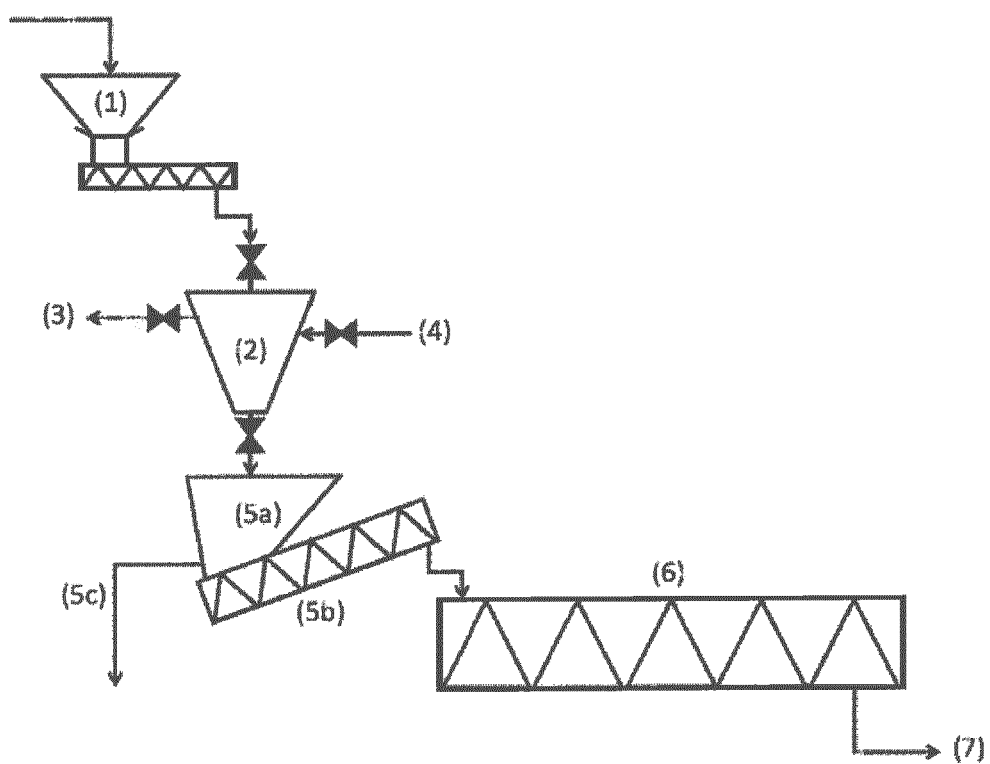

METHOD FOR THE MODIFICATION OF WOOD

FIELD OF THE INVENTION

The present invention relates to chemical modification of a wood based material (lignocellulosic material) by means of acetylation. Particularly, the present invention is in the field of acetylation of wood elements and provides a process for continuous acetylation thereof.

BACKGROUND OF THE INVENTION

In order to produce wood-based materials with a long service life, it has been known to chemically modify the wood and in particular to acetylate the wood. Thereby materials with improved material properties, e.g. dimensional stability, hardness, durability, etc., are obtained.

In the art, it is known to use batch processes, i.e. stop/start processes for the acetylation of wood particles. Such processes, however, often lead to poor product uniformity as the properties differ significantly from batch to batch and no two batches can ever be considered as identical.

Some references address the option to conduct wood acetylation in a continuous process. Thus, e.g., EP 0746570A1 discloses a process for the acetylation of lignocellulosic materials (LM) comprising a first step wherein the LM is brought into intimate contact with an acetylating agent comprising acetic anhydride as the major component at a temperature from 80° C. to 140° C. and bringing the acetylated LM from the first step into contact with a heated gas inert under the reaction conditions in a stripper at a temperature above 140° C. A comparable process is described in EP 650 998.

To the extent that these references would enable conducting a continuous process, this is on the basis of a plug screw feeder type of impregnation in series with continuous further processing (e.g. reaction). This is described for wood elements of relatively small dimensions, e.g., fibres, small particles, etc. When used for wood elements of larger dimensions, such as chips or strands, the plug screw will normally lead to a product wherein the wood dimensions have become smaller (crushed chips, crushed strands, broken fibres, smaller particles etc.). Particularly, if chips or strands are used, no plugging effect can be achieved to separate between zones with different pressures and/or atmospheres without destruction/crushing of the chips or strands. It is desired to provide a process for the continuous acetylation of wood particles, and particularly of wood chips or strands, wherein the particles are not damage in the way as done when using a plug screw feeder.

Moreover, in the acetylation of wood elements, particularly of wood chips, a technical challenge in providing a suitable continuous process, is to combine the advantages of a continuous process, with the desired result of a sufficiently high degree and uniformity of acetylation.

It should be noted that in determining wood acetylation degrees, two different approaches are taken in the field. One is based on WPG (Weight Percentage Gain). WPG compares a sample before and after acetylation treatment, and as a result any substances added (and any residues still present in the wood) increase the value. WPG is explained in the following formula: WPG=$(M_{increase}/M_{sample\ before\ reaction})\times 100\%$. Herein M stands for mass, and $M_{increase}=M_{sample\ after\ reaction}-M_{sample\ before\ reaction}$.

The other approach, is to actually measure the acetyl content (AC). This is given as AC=$(M_{acetyls}/M_{sample\ after\ reaction})\times 100\%$. Typically HPLC (high-pressure liquid chromatography) can be used to quantify the acetate ion concentrations resulting from the saponification of acetyl groups from the $M_{acetyls}$.

The different results for WPG and AC can be explained with reference to the following theoretical example: a sample of, e.g., 1 g of wood is acetylated and after the reaction has a mass of 1.25 g. Thus $M_{acetyls}$ is 0.25 g. The resulting WPG is: $(1.25-1.00)/1.00*100\%=25\%$. Calculated as acetyl content, AC is $=(1.25-1.00)/1.25*100\%=20\%$.

Hence, care should be taken not to directly compare degrees of acetylation expressed in WPG with degrees of acetylation expressed in AC. In the present description AC values are elected to identify the degree of acetylation.

The present invention aims to provide a continuous process for the acetylation of wood elements, thereby securing the concomitant advantages of consistency in quality (such as acetyl levels, and preferably also residual acetic acid and residual acetic anhydride level) and cost over existing batch processes. Particularly, the invention also aims to provide a continuous acetylation process that enables the production of all wood elements having a relatively high degree of acetylation.

It is notoriously difficult to obtain acetylation degrees of AC higher than 20% for wood elements. In the art, such degrees are only obtained via catalyzed processes. In catalyzed acetylation processes, a catalyst for the acetylation reaction is added to the wood. These are frequently toxic organic substances, such as pyridine, but also sodium bicarbonate, potassium acetate, and other salts, particularly acetate salts are known. The invention aims at providing a non-catalyzed process, thus avoiding the drawback of having residues of additional foreign substances (viz. the catalyst) remain in the wood.

SUMMARY OF THE INVENTION

In order to better address one or more of the foregoing desires, the invention presents, in one aspect, a process for the continuous acetylation of wood elements comprising the following steps:

(a) impregnating a plurality of batches of wood elements with an acetylation fluid comprising acetic anhydride and/or acetic acid so as to provide a plurality of batches of impregnated wood elements;

(b) collecting said plurality of batches of impregnated wood elements in such a manner as to provide a continuous feed of impregnated wood elements to a Reaction Chamber;

(c) subjecting a continuous flow of impregnated wood elements to acetylation reaction conditions in said Reaction Chamber so as to provide a continuous flow of acetylated wood elements exiting said Reaction Chamber.

In another aspect, the invention provides a plant for the acetylation of wood elements, said plant comprising
(i) at least one Impregnation Chamber,
(ii) a Collection Chamber having an inlet in connection with an outlet of the at least one Impregnation Chamber, said connection being such as to allow wood elements to flow from the Impregnation Chamber to the Collection Chamber;
(iii) a Reaction Chamber having an inlet in connection with the outlet of the Collection Chamber, said connection being such as to allow wood elements to flow from for the Collection Chamber to the Reaction Chamber, wherein the Reaction Chamber is designed so as to provide a continuous transport of wood elements from the inlet to an outlet thereof.

In yet another aspect, the invention presents acetylated wood elements, obtainable by a non-catalyzed acetylation process, and preferably chips, strands, or particles, wherein the acetylated wood elements have an acetyl content (AC) of at least 20.5%, preferably at least 21%, and particularly of AC 21% to 26%.

In a further aspect, the invention provides a process for the continuous acetylation of wood elements comprising the following steps:

(a) providing wood elements impregnated with an acetylation fluid comprising acetic anhydride and/or acetic acid so as to have a Retained Weight Gain, as defined below, of at least 20%;

(b) introducing said impregnated wood elements into a Reaction Chamber;

(c) subjecting a continuous flow of impregnated wood elements to acetylation reaction conditions in said Reaction Chamber so as to provide a continuous flow of acetylated wood elements exiting said Reaction Chamber.

DESCRIPTION OF THE DRAWING

FIG. 1 is a schematic drawing depicting a flow scheme of a process and plant according to the invention. The reference signs in the drawing have the following meaning:

(1) Incoming wood element stream, in this drawing this incoming wood element stream is received in a dosing hopper-screw combination;
(2) Impregnation Chamber that can be closed off from the surrounding atmosphere;
(3) Vacuum connection;
(4) Acetylation filling and pressurizing connection;
(5) Collection Chamber;
(5a) vessel to collect and store the impregnated wood elements;
(5b) outlet from the Collection Chamber allowing impregnated wood elements to be fed into the Reaction Chamber;
(5c) drain for separation of excess liquid;
(6) Continuous Reaction Chamber according to first-in-first-out principle;
(7) Outgoing stream of acetylated wood elements.

DETAILED DESCRIPTION OF THE INVENTION

The invention, in a broad sense, is based on the judicious recognition that an optimal continuous acetylation process for wood elements, can be realized starting from a batchwise impregnation with acetylation fluid.

In discussing this process, the following basic definitions are to be taken into account.

An Impregnation Chamber is a vessel, or an otherwise suitable container to hold wood elements and bring these into contact with an acetylation fluid. Preferably, the Impregnation Chamber can be closed off from the surrounding atmosphere, and be operated under reduced as well as increased pressure, preferably under vacuum. In general, the Impregnation Chamber will be a vessel that can be filled with solids, evacuated, filled with liquids, pressurized. Such vessels are known to the skilled person. From the vessel, a liquid including impregnated chips can be discharged without damaging the impregnated chips. To this end, preferably, a vessel is used having a relatively large discharge opening (e.g. 200 to 500 mm), preferably a conic vessel allowing an angle of repose of 10° to 25°, and a relatively low surface roughness (preferably 0.1 µm to 5 µm, more preferably 0.5 µm to 2 µm).

The Impregnation preferably is suitable for conducting a Bethel type of wood impregnation process. In the Bethel process, the wood is placed in a vacuum chamber and vacuum is applied to draw air from the wood. Active ingredients (in the present invention: an acetylation fluid) is then added to the chamber under vacuum. After filling the chamber with liquid a pressure generally up to 250 pounds per square inch (psi) can be applied, preferably 150 psi to 200 psi. The pressure is removed so that the wood is again subject to atmospheric pressure. This type of process is preferred, since it should normally result in a maximum impregnation load, which is believed to have a direct relation to a desired maximum acetyl level.

However, in the event that maximum acetylation fluid uptake after impregnation is not a primary goal, more economical impregnation processes can also be used. Examples thereof, known to the person skilled in the art of wood impregnation, are the so-called Lowry and Rueping processes. These processes require no initial vacuum. Instead, the impregnation fluid is forced deep into the wood under pressure. The compressed gas inside the wood then expands when the pressure is released, causing any excess preservative to be forced out of the wood.

Also methods different from the Lowry or Rueping processes can be used, such as spraying methods. The latter is typically used in fully continuous wood acetylation processes, which have as one of their drawbacks that relatively low acetyl levels are obtained. One of the advantages of the present invention is the freedom to choose the impregnation conditions irrespective of the reaction conditions and vice versa.

A Collection Chamber is a vessel, a funnel, or otherwise any device suitable to collect and store impregnated wood elements. If employed, the Collection Chamber will have an inlet allowing impregnated wood elements to be received from one or more Impregnation Chambers. If employed, the Collection Chamber will have an outlet allowing impregnated wood elements to be fed into a Reaction Chamber. The Collection Chamber preferably has a funnel-type geometry. This provides, in a technologically simple manner, a suitable inlet, a suitable place to hold a buffer volume of impregnated wood elements, and an outlet allowing a controlled amount of impregnated wood elements to be fed into a Reaction Chamber. The Collection Chamber functions, inter alia, as a receiving vessel to smoothen any peak loads from unloading the Impregnation Chamber towards the Reaction Chamber; further to allow longer submerged contact time between chips and acetylation fluid resulting in further swelling of the wood chips material and thus increased acetylation fluid uptake. Additionally in the Collection Chamber (also referred to as a receiving/buffering vessel) excess liquid may be separated from the ongoing impregnated wood elements that go on to the continuous reactor. Also, the Collection Chamber can be used to introduce additional temperature control.

A Reaction Chamber is a vessel, a reactor, or otherwise any device suitable to subject wood elements, impregnated with acetylation fluid, to reaction conditions that bring about acetylation of the wood. In the invention the Reaction Chamber, as opposed to reaction chambers used in batch acetylation processes, is operated as continuous reactor. In an interesting embodiment, the Reaction Chamber is operated with two or more zones wherein different temperatures are applied. This is a suitable measure to optimize the application of heat to the wood elements in the course of the acetylation reaction. Preferably two to five zones are applied. The skilled person will be able to determine the desired heating regimen, i.e. the number of zones, the temperatures applied therein, and the effective residence time in each of these zones. It will be understood that the precise optimization depends on circumstances such as the type and shape of wood to be acetylated and the specific apparatus chosen for acetylation.

Suitable reactors include, but are not limited to, liquid or gas-phase reactors known in the art of wood acetylation. A gas-phase reactor is preferred. This type of reactor allows subjecting the impregnated wood elements at higher temperatures, whilst at relatively low pressures. As a result, the residence time in a gas-phase type reactor can generally be longer than in e a liquid-type reactor, which is beneficial to the acetylation levels. Also, in a gas-phase reactor the wood elements are not prone to washing out of acetic acid. In case of a liquid-phase reactor (i.e., without separating of excess liquid from the impregnated particles) washing out of this acetic acid would result in lowering the acetic anhydride concentration in the surrounding acetylation fluid Also resins, as a desirable component of wood, are better retained in a gas-phase type reactor than in a liquid type reactor.

In order to be suitable for continuous operation, the Reaction Chamber has an inlet connected to the Collection Chamber or, if the latter is dispensed with, a plurality of Impregnation Chambers. The Reaction Chamber itself is designed in such a way as to allow the input of impregnated wood elements, and the output of acetylated wood elements, to be continuous. This can be realised in various ways, controlled by gravitation, by mechanical forces, or both. Preferably, the wood elements are carried through following the principle of plug flow, which implies a "first-in-first-out" principle.

The Reaction Chamber may comprise a vertically arranged plug flow reactor through which the wood elements pass downwardly through an acetylation fluid. An example of simple gravitational flow is a Reaction Chamber that is tilted in the sense that the inlet is positioned higher than the outlet. As a result thereof, wood elements will flow, by gravitation, from the inlet to the outlet, whilst being subjected to acetylation conditions. An example of mechanical force is a Reaction Chamber comprising a screw conveyor serving to transport wood elements from the inlet to the outlet. In one embodiment, the transportation forces will be provided by a combination of mechanical forces exerted by a screw and gravitational forces provided by having an inlet at higher level than an outlet. Most preferably, a screw conveyor is employed having a substantially horizontal screw, as a result of which the transportation is fully controlled by the mechanically operated screw, and not affected by gravitation. Both single and multiple screw conveyors can be used.

The process of the invention is particularly suitable for obtaining wood elements acetylated so as to have relative high acetyl levels, preferably higher than 18%, more preferably at least 20.5%, more preferably higher than 21%, still more preferably of from 21% to 26%, all percentages expressed as AC values.

Without wishing to be bound by theory, the present inventors believe that the possibility to obtain such high levels in a continuous acetylation process, is determined initially by the judicious selection of a batchwise impregnation, the process conditions of which can be tuned independently of the actual acetylation step.

As mentioned above, the impregnation may be conducted so as to result in a maximum impregnation load (which, in theory, would mean that the wood elements are fully saturated with impregnation fluid), but also by methods not leading to the maximum.

Particularly, the present inventors believe that the batchwise impregnation as described above is capable of resulting in wood elements that are impregnated not only in easily accessible voids, but also in spots that are more difficult to access. The latter spots are distinguished by the fact that, once impregnated, they retain the acetylating liquid to a great extent. The nature of this retaining may be based on chemical interaction with the wood as well as on possible physical interaction with the wood matrix. Whether or not this type of impregnation has occurred can be determined with reference to the Retained Weight Gain (RWG).

The RWG is determined as follows:

reference value is the mass of a volume of wood elements contained in a glass cylinder, of known empty weight, internal diameter 80 mm and internal height 90 mm. This mass is determined by filling the cylinder with wood elements in a free-flowing manner (i.e. without shaking or pushing it into the cylinder) and gently wiping off any excess wood elements (i.e. those wood elements that are over the brim) with a spatula. Then, the mass of the wood elements ("reference value") is determined by weighing the filled cylinder and subtracting the empty weight of the cylinder.

in the RWG test, the aforementioned cylinder is filled with impregnated wood elements, in the above-described manner;

the contents of the cylinder are transferred to a beaker having a diameter of 140 mm and a height of 240 mm;

said beaker, filled with the wood elements, is placed inside a preheated natural convection oven set at 160° C. for a period of 45 minutes;

the beaker is taken out of the oven and the mass of the wood elements ("test value") is determined by weighing the filled cylinder and subtracting the empty weight of the cylinder.

In the foregoing test method, the impregnated wood elements are, prior to the placement in the oven, maintained at the temperature at which they exited from impregnation; the exit from impregnation is to be understood as the exit from the final step before the wood elements would be subjected to acetylation reaction conditions in a Reaction Chamber.

The RWG (%) is calculated with formula:

$$[M_{test\ value}(g) - M_{reference\ value}(g)]/M_{reference\ value}(g) \times 100\%$$

The wood elements are preferably sampled, and the RWG determined, in any manner such that either a representative sample of the wood elements is obtained or that an average of the RWG of the batches of wood elements is determined over the period in question.

In an alternative embodiment, the RWG is the RWG of one and the same batch of wood elements, hereinafter indicated as RWG*. Herein the wood elements employed to determine the reference value are themselves used for impregnation and subjected to heating as defined above, and then weighed so as to determine the test value for the same wood elements.

The wood elements can be the elements as indicated in the table below. It will be understood that the reference value and the test value are determined for the same type of wood elements. The wood elements are preferably chips, strands, or particles, and more preferably chips.

In connection herewith, the invention also pertains to a process for the acetylation of wood elements comprising the following steps:

(a) providing wood elements impregnated with an acetylation fluid comprising acetic anhydride and/or acetic acid so as to have a Retained Weight Gain (RWG), as defined above, of at least 20%;

(b) introducing said impregnated wood elements into a Reaction Chamber;

(c) subjecting a continuous flow of impregnated wood elements to acetylation reaction conditions in said Reaction Chamber so as to provide a continuous flow of acetylated wood elements exiting said Reaction Chamber.

In this process, the wood elements introduced into the Reaction Chamber preferably have an RWG of at least 30% and more preferably of at least 40%. A particular preferred feed of wood elements has an RWG of 40% to 50%. It will be understood that, in this aspect, the invention is based on the judicious choice to feed a continuous acetylation process with wood elements having a required RWG value, irrespective of the process (batch or continuous) by which they are impregnated.

As a further advantage, the invention also makes it possible to obtain high acetylation levels in a narrow distribution. I.e., particularly the choice for a continuous acetylation process employing the principle of plugflow, results in a consistent acetylation, with a relatively narrow distribution of residence time, viewed over a population of wood elements, under acetylation conditions.

In order to obtain preferred high acetyl levels in the wood elements, the Reaction Chamber should allow a sufficient residence time and, moreover, a narrow distribution of the residence time over the elements carried through. The latter particularly serves to provide a product that shows a good uniformity in respect of acetyl levels as well as the levels of residual acetic acid and acetic anhydride. Further, the Reaction Chamber should preferably allow for a gentle operation as possible, so as to optimally retain the geometry of the wood elements (particularly chips and strands) throughout the acetylation process.

The invention provides, as an advantage over typical fully continuous processing, that the impregnation can be conducted under conditions optimal for impregnation, viz. a sufficiently long standing time, with appropriate conditions of pressure and temperature. It also provides, as an advantage over processes conducted fully batchwise, the possibility to have the acetylation reaction conducted in a more uniform manner, as well as the general economic benefits associated with continuous production.

According to the invention, the overall process results in a continuous production of acetylated wood elements. This is enabled by collecting the impregnated wood elements in such a manner as to provide a continuous feed thereof to a Reaction Chamber. Several methods are available to this end.

One is to operate a plurality of Impregnation Chambers in parallel, ensuring that at all times, from one of these chambers, impregnated wood elements can be fed to a Reaction Chamber. This can be done, e.g., on the basis of three such Impregnation Chambers, say chambers (A), (B), and (C). This allows chamber (A) to unload impregnated elements, whilst wood elements in chamber (B) are being impregnated, and chamber (C) is being loaded with elements to be impregnated. Next, chamber (B) will be unloaded, whilst the batch in chamber (C) is being impregnated, and chamber (A) is being loaded. It is preferred, in this embodiment, to operate a larger number of Impregnation Chambers, so as to allow a longer impregnation time between loading and unloading. A preferred number of Impregnation Chambers is 1-15, more preferably 1-4.

In a preferred embodiment, the impregnated wood elements are not directly fed into a Reaction Chamber, but are collected in a Collection Chamber, preferably a funnel-type container. This can be done starting from the above plurality of Impregnation Chambers. However, an advantage is that the use of a Collection Chamber will allow the impregnation to be done in a single Reaction Chamber. The only prerequisite for operating a continuous acetylation process is that the Collection Chamber is fed with impregnated wood elements at a sufficient rate to continuously feed a Reaction Chamber. Advantageously, the Collection Chamber therefore has a relatively large volume, e.g. 1-15 times the volume of the Impregnation Chamber. Optionally, the feature of a Collection Chamber is combined with the feature of a plurality of Impregnation Chambers.

The morphology of the wood based material may be, but is not limited to, wood chips, wood strands, wood particles, etc. hereafter referred to as wood elements. The process and plant of the invention can be used for the acetylation of durable and non-durable hardwoods, as well as durable and non-durable softwoods. The wood elements preferably belong to non-durable wood species such as soft woods, for example, coniferous trees, typically spruce, pine or fir, or to non-durable hardwoods. Preferred types of wood are spruce, sitka spruce, maritime pine, scots pine, radiata pine, eucalyptus, red alder, European alder, beech and birch.

Typical dimensions of wood elements as defined in accordance with the present invention are given in the following table.

| | Typical dimensions of wood elements | | | | | |
|---|---|---|---|---|---|---|
| | length (mm) | | width (mm) | | thickness (mm) | |
| wood element | from | to | from | to | from | to |
| Chips | 5 | 75 | 5 | 50 | 1.5 | 25 |
| Strands | 20 | 120 | 5 | 40 | 0.25 | 1.5 |
| splinters (slivers) | 5 | 75 | 0.15 | 0.5 | 0.15 | 0.5 |
| Particles | 1.5 | 20 | 0.15 | 5 | 0.15 | 5 |
| Fibre bundles | 1.5 | 25 | 0.15 | 0.5 | 0.15 | 0.5 |
| Fibres | 1 | 5 | 0.05 | 0.1 | 0.05 | 0.1 |

The benefits of the process of the invention are exhibited to the greatest extent in the event of wood chips, strands, or particles. Most preferably, the wood elements are wood chips.

Wood elements of a single size range are preferred to facilitate a homogeneous mass flow.

Before impregnation, preferably, wood elements with a moisture content of less than 15% by weight are provided. This can be achieved by pre-drying wood elements having a higher moisture content. The pre-drying can be done in a continuous or batch process by any method known in the wood industry. Preferably, the moisture content of the wood elements is less than 8%, more preferably in a range of from 0.01% to 5%, still more preferably in a range of from 0.5% to 4%.

During impregnation the elements are contacted with the acetylation fluid allowing sufficient uptake of the fluid by the wood elements for subsequent acetylation. The acetylation fluid preferably comprises acetic anhydride and/or acetic acid, and preferably a mixture of acetic anhydride and acetic acid. In a preferred embodiment, the acetylation fluid contains 40-100 wt. % acetic anhydride and 0-60 wt. % acetic acid. Within this range a mixture of 75-95 wt % acetic anhydride and 5-25 wt % acetic acid has been found to be beneficial.

A preferred temperature range during impregnation is from 20° C. to 180° C. The elements to fluid ratio is preferably at least 1 to 4. In the case of an anhydride/acid mixture having an excess of anhydride, a preferred temperature is 60° C. to 90° C.

Preferably, excess liquid is separated from the impregnated wood elements before these enter the Reaction Chamber. More preferably this is realized in the aforementioned Collection Chamber. By excess is meant acetylation fluid that has not impregnated the wood. It may be removed from the reactor by any effective method like free draining or other technologies. During this step, sufficient acetylation fluid is retained inside the elements for subsequent acetylation.

In the Reaction Chamber, the impregnated wood elements are acetylated in a reactor for continuous acetylation, according to the "first in first out" principle. The residence time of the wood elements in the acetylation reactor can be controlled in order to attain the desired modification level of the elements, e.g. acetylation degree. The required residence time may also depend on the acetylation temperature. The acetylation temperature is 100-200° C., and preferably 135-180° C. Preferably, the acetylation step is conducted during 1 to 300 minutes, more preferably 30-180 minutes.

The acetylation in this process is preferably performed at temperatures higher than the atmospheric boiling point of the acetylation fluid, although the overall gas pressure in the reactor is preferably around atmospheric. These higher temperatures significantly speed up the acetylation process. Therefore, acetylation temperatures in this continuous process are preferably in the range of 135° C.-180° C., The ratio of evaporation to reaction can be adjusted by the pressure level in the reaction chamber. A higher pressure at a certain reaction temperature means a lower evaporation rate at essentially the same reaction rate. Preferably the pressure inside the reaction chamber is maintained between −0.40 barg and 3 barg and more preferably between −0.2 barg and 1 barg and still more preferable between −0.1 and 0.5 barg.

In one embodiment the "first in first out" principle is fulfilled by using a screw conveyor filled with impregnated and separated from excess liquid wood elements. Due to the gentle rotation of the screw, preferably in a horizontal position, the wood elements are prevented from attrition. This results in good element quality during the process. In one embodiment the reactor contains a double, parallel screw conveyor in order to increase the effective volume of the reactor.

The temperature during the acetylation can be controlled by a heated gas loop, which contains a gas at least partially saturated with acetic anhydride and/or acetic acid or being superheated acetic acid and/or acetic anhydride. An inert gas means that it does not participate in the acetylation reaction and is preferably nitrogen, carbon dioxide, or flue gas. In another embodiment, the screw conveyor reactor comprises a screw axle and a conveyor casing and the temperature of the acetylation is controlled by heating the screw axle and/or the conveyor casing. In this embodiment, the impregnated wood elements are directly heated by the screw axle and/or the conveyor casing. This heating can be performed by steam, oil or electrically. In another embodiment the heating can be done by a combination of a heated gas loop, heating by the screw axle and by the conveyor casing.

In addition to the reaction, the heating of the wood elements in the reactor also results in partial drying. Initial liquid contents of the chips, typically in the range of 100% to 200% may be reduced to 0.5% to 100% during the process, without effectively hindering effective acetylation.

If desired, after the acetylation, the modified acetylated wood elements may be further dried by any method known in industry to a desired liquid content. Drying of the acetylated wood elements may be conveniently effected, e.g. by superheated vapours, hot nitrogen, carbon dioxide and/or flue gas, or vacuum.

In an interesting embodiment, the inventors have realized that suitable apparatus for the continuous acetylation of impregnated wood elements can generally also be used for the post-drying of the acetylated elements. Thus, e.g., one screw conveyor can be used for acetylation, and a next screw conveyor can be used for drying. In another embodiment the reaction chamber is operated in such a way that it acts as a post-acetylation dryer as well, which would obviate the need for a separate, dedicated post/drying unit.

In a preferred embodiment, the Reaction Chamber is a screw conveyor, and post-drying is conducted using a so-called tray dryer. In another preferred embodiment, a tray dryer can also be used as a Reaction Chamber. This has, as one of its advantages, an optimally gentle operation during acetylation. Other arrangements can be used as well.

Suitable screw conveyors include single screw and multiple screw conveyors, preferably a double, parallel screw conveyor. Such equipment is well-known to the skilled person. Examples of suitable dryers, that also may be used as reaction chambers, include hot plate dryers, convective heat dryers, vacuum type plate dryers, disc dryers, tray dryers, belt dryers (including multi-belt dryers, vacuum belt dryers, low temperature belt dryers), continuous rotary drum dryers, including vacuum drum dryers, extraction trains, screw dryers.

Other equipment that is well suited as reaction chamber are immersion type extractors and percolation type extractors.

Wood elements acetylation levels of 17% to 26% acetyl may readily be obtained by the present invention, as measured by high-pressure liquid chromatography (HPLC). The HPLC is used to quantify the acetate ion concentration resulting from the saponification of acetyl groups.

The process of the invention, makes it possible to produce wood elements, and particularly wood chips or strands, having acetyl contents that before were not achievable in the art in a continuous acetylation process. The judicious combination of optimal impregnation in a batch process and optimal reaction, well distributed over the impregnated elements, in a continuous process, achieves preferred acetylation levels (expressed as Acetyl Content) of 15% to 25%. Particularly, the process of the invention makes it possible to produce acetylated wood elements having acetyl levels hitherto unachievable in continuous processes, and also unachievable in non-catalyzed acetylation processes.

In this respect, the invention also pertains to acetylated wood elements, obtainable by a non-catalyzed acetylation process, and preferably chips, strands, or particles, wherein the acetylated wood elements have an acetyl content (AC) of at least 20.5%, preferably at least 21%, and particularly of AC 21% to 26%.

Particularly, as a preferred form of acetylated wood elements obtainable by non-catalyzed acetylation processes, the invention pertains to acetylated wood elements, and preferably chips, strands, or particles, substantially not containing residual acetylation catalyst, wherein the acetylated wood elements have an acetyl content (AC) of at least 20.5%, preferably at least 21%, and particularly of AC 21% to 26%. Residual acetylation catalysts particularly consist of organic bases such as pyridine, salts such as sodium bicarbonate, or acetate salts, the latter including potassium acetate. The substantial absence of such catalyst residues contained in the acetylated wood, defines the result of a non-catalyzed acetylation process. In acetylated wood obtained by a catalyzed processes, the presence of such residues (even if at ppm scale) will normally be inevitable. It has hitherto not been possible to achieve acetylation contents of AC as mentioned above, and particularly not of higher than 21%, more particularly of AC 21%-26% in acetylated wood.

The presence of residual catalyst is generally found throughout the thickness of the wood element.

It is noted that the process of the invention can also be carried out as a catalyzed acetylation process, particularly if still higher acetylation contents and/or a fast reaction are desired.

Acetylated wood elements according to the present invention may usefully be refined and converted to board, such as medium density fibreboard, MDF, or oriented strand board, OSB, or particle board, which will possess the superior dimensional stability, durability, stability to ultra-violet light and thermal conductivity, compared with board derived from non-acetylated wood elements.

The invention is illustrated by the following, non-limiting examples.

Example 1

Chips of Sitka Spruce wood with a majority of chip size approximately 2.5 cm×1.5 cm×1 cm in size are dried in a convective wood drying kiln down to a moisture content of 2.4% (weight of moisture/weight of bone dry wood chips). Before bringing this chip material into the impregnation chamber, this impregnation chamber is evacuated to a vacuum of −0.9 barg to remove potential residual organic fluid from the foregoing impregnation batch. After this evacuation step the dried chip material is fed into this impregnation vessel. Subsequently, a vacuum of −0.9 barg is implemented to this chips-filled impregnation chamber, after which the hot acetylation fluid (consisting of 90/10 w/w ratio acetic anhydride/acetic acid) at 130° C. is dosed to this evacuated impregnation vessel. This filling with hot acetylation fluid is performed under evacuation action. After complete submerging of the chips with this hot acetylation fluid the impregnation vessel is pressurized to 10 barg for 1 minute. After this pressurized impregnation step the pressure is cleared to effectively 0 barg and the material is transferred into the next process step: in the cylindrical collection vessel the excess acetylation liquid is drained by gravitational forces. From this collection vessel step the impregnated chips are continuously fed into the reactor chamber. This reaction chamber is a horizontal cylinder, tooled with a screw, to which the chips with the hot impregnated liquid are fed; this horizontal cylinder is equipped with a heating gas loop and a condensing system to maintain the reaction pressure at effectively 0 barg. The heating gas that is passing the reacting impregnated chips comprises a mixture of acetic anhydride and acetic acid. The heating gas loop temperature is controlled at 135° C.; this acetylation condition is continuously operated at effectively 0 barg. After a residence time of 225 minutes in this reaction vessel the chips are highly acetylated where the acetyl content of the chips amounts to 22.5% as measured by HPLC. After this acetylation reaction step the acetylated chips are dried at 130° C. under reduced pressure to remove combined residual acetic anhydride and residual acetic acid to levels below 0.4%.

Example 2

Wood particles of Sitka Spruce with a majority of particle size approximately 1 cm×0.5 cm×0.5 cm in size are dried in a convective wood drying kiln down to a moisture content of 3% (weight of moisture/weight of bone dry wood particles).

The dried particles are fed into the impregnation vessel, which is then evacuated to −0.9 barg; after this evacuation the hot acetylation fluid (consisting of 90/10 w/w ratio acetic anhydride/acetic acid) with a temperature of 70° C. is dosed to this evacuated impregnation vessel. This filling with hot acetylation fluid is performed under continuous vacuum. After complete submerging of the particles with this hot acetylation fluid the impregnation vessel is pressurized to 10 barg for 1 minute. After this pressurized impregnation step the pressure is cleared to effectively 0 barg and the material is transferred into the next process step: in the cylindrical collection vessel the excess acetylation liquid is drained by gravitational forces. From this collection vessel step the impregnated wood particles are continuously fed into the reactor chamber. This reaction chamber is a horizontal cylinder, tooled with a screw, to which the particles with the hot impregnated liquid are fed; this horizontal cylinder is equipped with a heating gas loop and a condensing system to maintain the reaction pressure. The heating gas that is passing the impregnated particles comprises a mixture of acetic anhydride and acetic acid. The heating gas loop temperature is controlled at 135° C.; this acetylation condition is continuously operated at effectively 1 barg. After a residence time of 120 minutes in this reaction vessel the wood particles are acetylated to 21.9% as measured by HPLC. After this acetylation reaction step the acetylated chips are dried at 130° C. under reduced pressure to remove combined residual acetic anhydride and residual acetic acid to levels below 0.4%.

Example 3

In this example, strands of Southern Yellow Pine with a majority of strand size approximately 10 cm×4 cm×0.1 cm in size are dried in a convective wood drying kiln down to a moisture content of 2%.

This dried strand material is fed into the impregnation vessel; after filling the above dried strands a vacuum of −0.95 barg is implemented for 10 minutes to this strands-filled impregnation chamber, after which hot acetylation fluid (consisting of 90/10 w/w ratio acetic anhydride/acetic acid) at 70° C. is dosed to this evacuated impregnation vessel. This dosing is performed under constant vacuuming. The dosing of the hot acetylation fluid is carried until complete submerging of the strands with this liquid. After complete submerging of the strands with this hot acetylation fluid the impregnation vessel is pressurized to 10 barg for 10 minutes. Subsequently the impregnation vessel is evacuated and again pressurized to 10 barg for another 10 minutes. After these alternating impregnation steps the pressure between the impregnation vessel and the collection chamber is leveled, because the collection chamber is operated at effectively 2 barg. After opening the bottom valve of the impregnation vessel the batch of impregnated strands together with the excess liquid is dropped into the collection chamber. Transport of the impregnated strands with an upward tilted transport screw allows for separation of the strands from the excess acetylation fluid. These drained impregnated strands that are fed to the reaction vessel contain about 1.6-1.8 kg of acetylation liquid per every kg of dry wood strands. After this separation from the excess acetylation liquid the strands are introduced in the reaction vessel, which consists of a heated horizontal double screw that rotates such that the residence time of the strands in this heated horizontal double screw is 120 minutes. This horizontal double screw is equipped with a heated gas loop. The heating gas that is passing the reacting impregnated strands comprises a mixture of acetic anhydride and acetic acid. The heating gas loop temperature is controlled at 135° C.; this acetylation condition is continuously operated at effectively 2 barg. After a residence time of 120 minutes in this reaction vessel the acetyl content of the strands amounts to 21.2±0.1%. After this acetylation reaction step the acetylated strands are dried at 130° C. under reduced pressure to remove combined residual acetic anhydride and residual acetic acid to levels below 0.9%.

The invention claimed is:

1. A process for the acetylation of wood elements comprising the following steps:
    (a) impregnating a plurality of batches of wood elements with an acetylation fluid comprising acetic anhydride and/or acetic acid so as to provide a plurality of batches of impregnated wood elements comprising acetylation fluid comprising acetic anhydride and/or acetic acid, wherein the impregnating step is carried out in an impregnation chamber, wherein the impregnation chamber is configured to be closed off;
    (b) collecting, combining and storing said plurality of batches of impregnated wood elements comprising acetylation fluid comprising acetic anhydride and/or acetic acid in a collection chamber in such a manner as to provide a continuous feed of impregnated wood elements to a reaction chamber, the collection chamber is a vessel having an inlet, a place to collect and store a buffer volume of impregnated wood elements, an outlet for impregnated wood elements and a drain for separation of excess liquid from the wood elements, wherein said outlet for impregnated wood elements allows a controlled amount of impregnated wood elements to be fed into the reaction chamber, wherein the volume of the collection chamber is 1 to 15 times the volume of the impregnation chamber;
    (c) subjecting a continuous flow of impregnated wood elements to acetylation reaction conditions in said reaction chamber so as to provide a continuous flow of acetylated wood elements exiting said reaction chamber, wherein
    excess impregnation liquid is removed from the impregnated wood elements by transport of the impregnated wood elements through an upward tilted transport screw.

2. A process according to claim 1, wherein the collection chamber has a funnel-type geometry.

3. A process according to claim 1, wherein the impregnated wood elements are continuously introduced into the reaction chamber.

4. A process according to claim 1, wherein the wood elements flow through the reaction chamber in plug flow and the reaction chamber is a heated horizontal double screw reactor.

5. A process according to claim 1, further comprising a step:
    (d) drying the acetylated wood elements in a screw conveyor so as to remove unreacted acetylation fluid from the acetylated wood elements.

6. A process according to claim 5, further comprising a step
    (e) withdrawing a continuous flow of acetylated wood elements from the drying apparatus of step (d).

7. A process according to claim 1, wherein the reaction chamber comprises a horizontal screw conveyor.

8. A process according to claim 1, wherein the moisture content of the wood elements subjected to step (a) is less than 8% by weight, preferably 0.01% to 5%.

9. A process according to claim 1, wherein the acetylation fluid comprises 40% by weight to 100% by weight acetic anhydride and 0% by weight to 60% by weight acetic acid.

10. A process according to claim 1, wherein in step (c), an overall gas pressure in the reaction chamber is approximately atmospheric pressure and an acetylation temperature is in a range of 135° C.-180° C.

11. A process according to claim 1, wherein the acetylation in step (c) is performed in two to five temperature zones and different temperatures are applied in each of the temperature zones.

12. A process according to claim 1, wherein the temperature of acetylation in step (c) is controlled by heating a heated gas loop containing a gas at least partially saturated with acetic anhydride and/or acetic acid.

13. The process according to claim 1, wherein step (a) involves applying a vacuum to the wood elements in the impregnation chamber to draw air from the wood elements and subsequently adding the acetylation liquid to the wood elements under vacuum.

14. The process according to claim 1, wherein:
    the wood elements are selected from the group consisting of wood chips, particles and strands;
    the wood chips have a length of 5 to 75 mm, a width of 5 to 50 mm, and a thickness of 1.5 to 25 mm;
    the wood particles have a length of 1.5 to 20 mm, a width of 0.15 to 5 mm, and a thickness of 0.15 to 5 mm; and
    the wood strands have a length of 20 to 120 mm, a width of 5 to 40 mm, and a thickness of 0.25 to 1.5 mm.

15. The process according to claim 1, wherein no acetylation fluid is introduced into the reactor.

16. The process according to claim 1, wherein the step of impregnating a plurality of batches of wood elements with an acetylation fluid further includes receiving a wood element stream in a hopper-screw combination at an inlet of the impregnation chamber, the hopper-screw combination including a hopper and a screw.

17. The process according to claim 1, wherein the wood elements introduced into the reaction chamber have a retained weight gain of at least 30%.

* * * * *